US006882208B1

(12) United States Patent
Suissa et al.

(10) Patent No.: US 6,882,208 B1
(45) Date of Patent: Apr. 19, 2005

(54) ADJUSTMENT OF AMPLITUDE AND DC OFFSETS IN A DIGITAL RECEIVER

(75) Inventors: Udi Suissa, Givataim (IL); Oren Eliezer, Plano, TX (US); Ran Katz, Givataim (IT)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/690,683

(22) Filed: Oct. 22, 2003

(51) Int. Cl.[7] .................................................. H03L 5/00
(52) U.S. Cl. ........................................ 327/307; 330/9
(58) Field of Search ........................... 327/307, 58, 62; 330/9

(56) References Cited

U.S. PATENT DOCUMENTS

| | | | | |
|---|---|---|---|---|
| 3,699,948 A | * | 10/1972 | Ota et al. ................... 600/523 |
| 3,838,448 A | * | 9/1974 | Garde et al. .................. 360/45 |
| 3,851,266 A | * | 11/1974 | Conway ..................... 327/307 |
| 4,458,322 A | * | 7/1984 | Veale ........................... 702/87 |
| 4,641,324 A | * | 2/1987 | Karsh et al. ................ 375/317 |
| 5,025,456 A | * | 6/1991 | Ota et al. .................... 375/318 |
| 6,043,766 A | * | 3/2000 | Hee et al. ...................... 341/94 |

* cited by examiner

Primary Examiner—Kenneth B. Wells
(74) Attorney, Agent, or Firm—Ronald O. Neerings; Wade James Brady, III; Frederick J. Telecky, Jr.

(57) ABSTRACT

A nonlinear adaptive mechanism for amplitude adjustment and DC estimation and compensation for use in a digital receiver such as a Bluetooth GFSK receiver. The mechanism uses a feed-forward technique that can be used in a multi-stage scheme to perform both DC compensation and amplitude adjustment of an input signal for use by subsequent processing stages. In a first stage, coarse DC offset compensation is performed and the offset estimates generated are subsequently frozen. In a second stage, the incoming signal with the DC offset subtracted from it, is then scaled into a narrow predefined range of amplitudes using a scaling mechanism that works with gains and attenuations that are powers of two in order to simplify implementation. In a third stage, the scaled compensated signal is then injected again into the same DC estimation mechanism, which was previously used for DC compensation in the first stage, for further DC offset estimation and compensation (i.e. fine DC estimation and compensation).

21 Claims, 10 Drawing Sheets

LISTING 1

```
IF BEFORE_RX_START
        MAX_KCH = 2⁻²;
        MAX_KDS = 2⁻⁹;              % THIS IS STAGE 1. IN THIS
        MIN_KCH = 2⁻²;              STAGE NO LIMITING IS REQUIRED
        MIN_KDS = 2⁻⁹;

ELSE
    IF AFTER_SYNC
        MAX_KCH = 2⁻⁷;
        MAX_KDS = 2⁻⁸;              % THIS IS STAGE 3. IN THIS
        MIN_KCH = 2⁻⁷;              STAGE THE MECHANISM IS QUIET
        MIN_KDS = 2⁻⁸;

ELSE
        MAX_KCH = 2⁻²;
        MAX_KDS = 2⁻⁸;              % THIS IS STAGE 2. IN THIS
        MIN_KCH = 2⁻²;              STAGE WE WORK ON SCALED SIGNALS
        MIN_KDS = 2⁻⁸;

END
    IF (MAX_PEAK(K)-MIN_PEAK(K)) >512
                                    % THE LIMITERS HAVE
        MAX_KDS = 2⁻⁴;              PRECEDENCE IN
        MIN_KDS = 2⁻⁴;              DETERMINING COEFFICIENTS

ELSEIF (MAX_PEAK(K)-MIN_PEAK(K)) <100
        MAX_KCH = 2⁻⁴;
        MIN_KCH = 2⁻⁴;
    END
END
```

FIG.6

LISTING 2

```
IF IQSPAN(10)==1           % PEAK-TO-PEAK >=1024    (IQSPAN IS 12 BITS 11:0)
    S_GAIN = 0;
ELSEIF IQSPAN(9)==1        % PEAK-TO-PEAK >= 512
    S_GAIN = 1;
ELSEIF IQSPAN(8)==1        % PEAK-TO-PEAK >= 256
    S_GAIN = 2;
ELSEIF IQSPAN(7)==1        % PEAK-TO-PEAK >= 128
    S_GAIN = 3;
ELSEIF IQSPAN(6)==1        % PEAK-TO-PEAK >= 64
    S_GAIN = 4;
ELSEIF IQSPAN(5)==1        % PEAK-TO-PEAK >= 32
    S_GAIN = 5;
ELSEIF IQSPAN(4)==1        % PEAK-TO-PEAK >= 16
    S_GAIN = 6;
ELSEIF IQSPAN(3)==1        % PEAK-TO-PEAK >= 8
    S_GAIN = 7;
ELSE                       % PEAK-TO-PEAK < 0
    S_GAIN = 8;
END

IF ABS(S_GAIN-PREVIOUS_S_GAIN) <= 1
    S_GAIN=PREVIOUS_S_GAIN;
ELSEIF S_GAIN-PREVIOUS_S_GAIN == 2
    S_GAIN=PREVIOUS_S_GAIN+1;
ELSEIF S_GAIN-PREVIOUS_S_GAIN == -2
    S_GAIN=PREVIOUS_S_GAIN-1;
END
```

FIG.10

ADJUSTMENT OF AMPLITUDE AND DC OFFSETS IN A DIGITAL RECEIVER

FIELD OF THE INVENTION

The present invention relates to the field of data communications and more particularly relates to a method of and apparatus for adjustment of amplitude and DC offsets in a digital receiver.

BACKGROUND OF THE INVENTION

In digital communications systems, a carrier signal is modulated with the digital data to be transmitted over the channel, where it typically suffers various forms of distortion, such as additive noise. The digital data is often transmitted in bursts wherein each burst consists of a number of data bits. Upon reception, the signal must be demodulated in order to recover the transmitted data.

It is common for receivers to employ direct conversion (i.e. homodyne receiver) to perform the demodulation of the received signal. The received signal is mixed with a local oscillator signal at the carrier frequency to produce I (in-phase) and Q (quadrature) baseband signals. An advantage of direct conversion receivers is that they are efficient in terms of cost and current consumption. The advantage is derived from having the incoming RF signal directly down-converted to baseband, in both I and Q components, without use of any IF frequencies.

In other receivers, the incoming RF signal is mixed down first to an intermediate frequency (IF) signal. The IF frequency may be any frequency for which the implementation of the necessary amplification and/or filtering is convenient.

For example, in the Bluetooth receiver utilizing the present invention, the front-end outputs a low frequency IF signal that can cover a large range of amplitudes that can be represented by an 1-bit word after quantization. A problem arises, however, in that the IF signal may ride on a wide range of DC levels that is often significantly wider than the amplitude of the signal itself. For example, the DC level may be tens of dB larger when low level RF signals are received.

DC offsets in a receiver are typically introduced in the mixer in the front end portion of the receiver, but may also result from nonlinearities and mismatches in other circuits of the receiver. Leakage of the local oscillator signal and self-downconverting to DC through the mixer causes the DC components to be generated at a wide range of levels depending on various factors. In order to properly detect and decode the received signal, the DC components must be removed or suppressed. Since it is usually not practical to predict the exact DC offset and compensate for it without actually measuring it, a compensation mechanism is often needed which determines the level of undesired DC that must be eliminated from the signal. In the case of a Bluetooth receiver, the DC components must be removed before the IF to Zero-IF conversion (i.e. the second frequency conversion in the receiver). Additional causes of DC offsets being generated include transistor mismatch in the signal path, the presence of a large near-channel interferer leaking into the local oscillator and self-downconverting to DC at the mixer. These would also have a measurable effect on the signal at this point of the circuit and would therefore be compensated for by a mechanism that could determine the DC level at that point.

Digital demodulators used in the receiver are sensitive to the DC offsets. They typically require suppression of DC offsets such that the remaining residue is limited to 5% of the signal's amplitude. At this point, the performance degradation caused by the DC bias is tolerable (e.g., fractions of dB of degradation in BER versus Eb/No performance). For relatively weak signals, it is more difficult to eliminate the DC bias of the received signal with 5% relative accuracy (referenced to the signal's amplitude) due to the limited resolution of the quantizer.

An additional problem arises considering the high complexity multi-coefficient filters used in down conversion and image rejection stages in the digital receiver. Consequently, the input signal must be approximately adjusted to within +/−6 dB dynamic range in order to avoid performance degradation caused by either truncation or saturation during subsequent digital processing. In addition, it is desirable that any implementation of a solution to this problem has minimum gate count to reduce size, cost and current consumption. Therefore, there is a need for a mechanism that overcomes the problems associated with the prior art that is able to estimate the DC offset in a signal and compensate an input signal for the DC offset estimate.

SUMMARY OF THE INVENTION

The present invention solves the problems of the prior art by providing a mechanism for amplitude adjustment and DC offset compensation. The mechanism is a nonlinear adaptive mechanism for DC estimation and compensation and is used in a feed-forward manner. The mechanism can be used, as shown in an example embodiment, in a multi-stage digital scheme to perform both DC compensation and amplitude adjustment of an input signal for use by subsequent processing stages. In a first stage, coarse DC offset compensation is performed. In a second stage, the incoming signal with the DC offset subtracted from it, is then scaled into a narrow predefined range of amplitudes using a scaling mechanism that works with gains and attenuations that are powers of two in order to simplify implementation. In a third stage, the scaled compensated signal is then injected again into the same DC estimation mechanism, which was used previously for DC compensation in the first stage, for further DC offset estimation and compensation (i.e. fine DC estimation and compensation).

In the example embodiment presented herein, the same DC estimation block hardware is used for both the first stage coarse DC estimation and removal and the third stage fine DC estimation and removal despite the differences in word sizes. This results in a significant gate count reduction.

The DC estimation mechanism is based on maximum and minimum peak determination and tracking and is coordinated with the gain changes in the scaler portion of the adaptive prescaler during reception. For both the I and Q data paths in the receiver, the maximum and minimum peaks are found and averaged to generate an estimate of the DC level, which is assumed to be the average of the two peak values, i.e. their middle. The DC estimate is then subtracted from the input signal to yield the DC compensated input signal.

An advantage of the present invention is that the DC compensation mechanism can be implemented in a relatively small size (i.e. low gate count) and adapts quickly to changing DC levels. This is in comparison to prior art solutions based on linear filtering that require relatively high gate counts to achieve sufficient filtering and have extended adaptation times. Another advantage is that in applications where the input signal is at low IF (i.e. near zero IF), the nonlinear nature of the mechanism of the present invention permits adaptation to any DC level without distorting the signal itself even in the case of near zero IF. This is in contrast to prior art solutions where filtering distorts the signal's spectrum and causes performance degradation. For example, suppressing DC which is 100 dB above the level of the received signal and is very close to it in frequency (IF of 500 kHz) is almost impossible using linear filtering.

Another advantage is that the DC compensation mechanism of the present invention provides fine DC offset cancellation using the multi-stage architecture wherein the final stage operates on a scaled signal. A further advantage is the very low gate count to implement the mechanism stemming from the reuse of the DC estimation hardware.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention a method of DC offset estimation, the method comprising the steps of determining a current maximum peak value of an input signal, determining a current minimum peak value of the input signal and calculating an average of the current maximum peak value and the current minimum peak value to yield a DC offset estimate.

There is also provided in accordance with the present invention an apparatus for DC offset compensation comprising first means for determining a current maximum peak value of an input signal comprising, means for comparing the input signal with a previous maximum peak value, means for adding the current maximum peak value to a first difference between the input signal and the previous maximum peak value, the first difference multiplied by a maximum charge coefficient to yield the current maximum peak value if the input signal is greater than the previous maximum peak value, means for subtracting a second difference between the current maximum peak value and the input signal multiplied by a maximum discharge coefficient from the previous maximum peak value to yield the current maximum peak value if the input signal is not greater than the previous maximum peak value, second means for determining a current minimum peak value of the input signal comprising, means for comparing the input signal with a previous minimum peak value, means for subtracting a first difference between the current minimum peak value and the input signal, the first difference multiplied by a minimum discharge coefficient and subtracted from the previous minimum peak value to yield the current minimum peak value if the input signal is greater than the previous maximum peak value, means for adding the current minimum peak value to a second difference between the input signal and the previous minimum peak value, the second difference multiplied by a minimum charge coefficient to yield the current minimum peak value if the input signal is not greater than the previous minimum peak value, third means for calculating an average of the current maximum peak value and the current minimum peak value to yield a DC offset estimate and fourth means for subtracting the DC offset estimate from the input signal to yield a DC offset compensated output signal.

There is further provided in accordance with the present invention an method of amplitude adjustment and DC offset compensation, the method comprising the steps of first performing coarse DC offset compensation comprising the steps of determining a first current maximum peak value of an input signal, determining a first current minimum peak value of the input signal, calculating an average of the first current maximum peak value and the first current minimum peak value to yield a first DC offset estimate, subtracting the first DC offset estimate from the input signal to yield a first DC offset compensated signal, scaling the first DC offset compensated signal to within a predefined range of amplitudes to yield a scaled signal, second performing fine DC offset compensation comprising the steps of determining a second current maximum peak value of the scaled signal, determining a second current minimum peak value of the scaled signal, calculating an average of the second current maximum peak value and the second current minimum peak value to yield a second DC offset estimate and subtracting the second DC offset estimate from the scaled signal to yield an output DC offset compensated signal.

BRIEF DESCRIPTION OF THE DRAWINGS

The invention is herein described, by way of example only, with reference to the accompanying drawings, wherein:

FIG. 6 is a pseudo code listing illustrating the gear shift logic portion of the DC estimation block in more detail;

FIG. 10 is a pseudo code listing illustrating the selection logic of the scaler portion of the adaptive prescaler in more detail.

DETAILED DESCRIPTION OF THE INVENTION

Notation Used Throughout

The following notation is used throughout this document.

| Term | Definition |
| --- | --- |
| AFC | Automatic Frequency Control |
| AGC | Automatic Gain Control |
| AHDL | Adaptive Hard Decision Logic |
| APS | Adaptive Prescaler |
| ASIC | Application Specific Integrated Circuit |
| BER | Bit Error Rate |
| DC | Direct Current |
| DCOC | DC Offset Compensation |
| FPGA | Field Programmable Gate Array |
| GFSK | Gaussian Frequency Shift Keying |
| HDL | Hardware Description Language |
| IF | Intermediate Frequency |
| PS | Prescaler |
| RF | Radio Frequency |
| RSSI | Receive Signal Strength Indicator |

DETAILED DESCRIPTION OF THE INVENTION

The present invention is a mechanism for amplitude adjustment and DC offset compensation. The mechanism functions to normalize the signal output from the RF front portion of a receiver before it is converted from IF to Zero-IF. The present invention is well suited for use in a digital receiver such as a Gaussian Frequency Shift Keying (GFSK) detector constructed according to the Bluetooth specification.

It is noted that the present invention is not limited to use with any particular modulation or communication system, although throughout this document the invention is described in reference to a Bluetooth communication system. Note that the invention is not limited to this communications system, as one skilled in the relevant electrical arts can apply the DC compensation mechanism of the present invention to other communication systems without departing from the spirit and scope of the present invention. Depending on the particular application and implementation, the invention is applicable for use with a multitude of communication systems, modulations and protocols. In general, the DC compensation mechanism of the present invention is applicable wherever it is advantageous to remove relatively high DC levels from a low level input signal. Such a need may be encountered not only in wireless communication systems, such as those based on the Bluetooth standard, but also in non-wireless or non communication systems.

Figure 1:
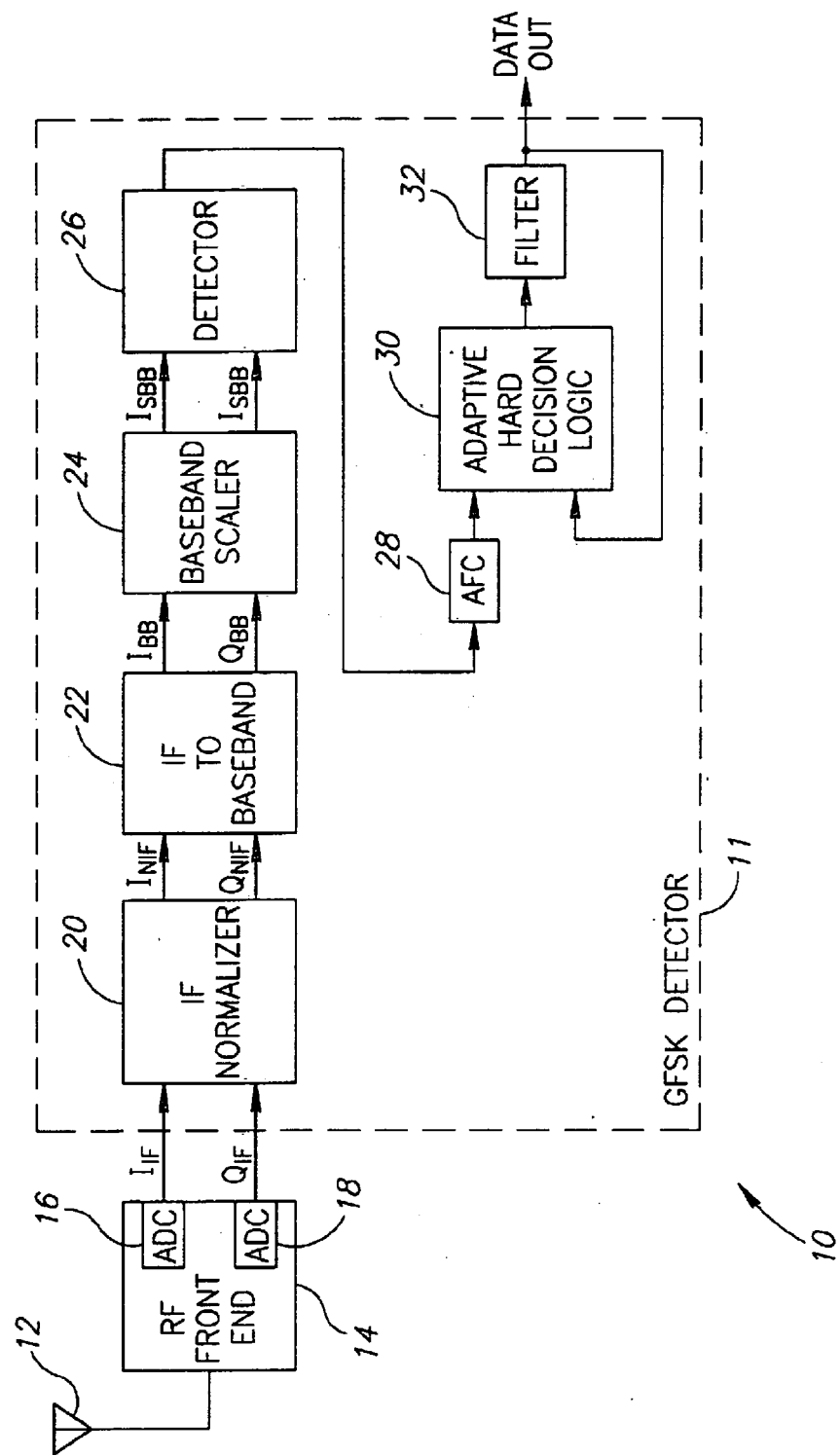
FIG. 1 is a block diagram illustrating an example GFSK detector including an IF normalizer incorporating the amplitude adjustment and DC offset compensation mechanism of the present invention.

A block diagram illustrating an example Bluetooth GFSK detector including an IF normalizer incorporating the amplitude adjustment and DC offset compensation mechanism of the present invention is shown in FIG. 1. The example receiver, generally referenced 10, comprises an antenna 12, RF front end 14 including analog to digital converter 16 for the in-phase I signal and analog to digital converter 18 for the out-of-phase Q signal, IF normalizer 20, IF to baseband converter 22, baseband scaler 24, detector 26, automatic frequency control (AFC) 28, adaptive hard decision logic (AHDL) 30 and filter 32.

The RF front end performs the amplification, mixing and filtering functions to generate both I and Q signal paths. The I and Q signals are input to the IF normalizer which is responsible for several tasks including DC offset compensation, prescaling and Automatic Gain Control (AGC) logic management for the entire receiver. Note that the term normalizer is intended to indicate that the IF signals are processed in order to bring their amplitudes to within a predefined working region such that they may be handled properly by subsequent processing stages within the GFSK detector 11.

Figure 2:
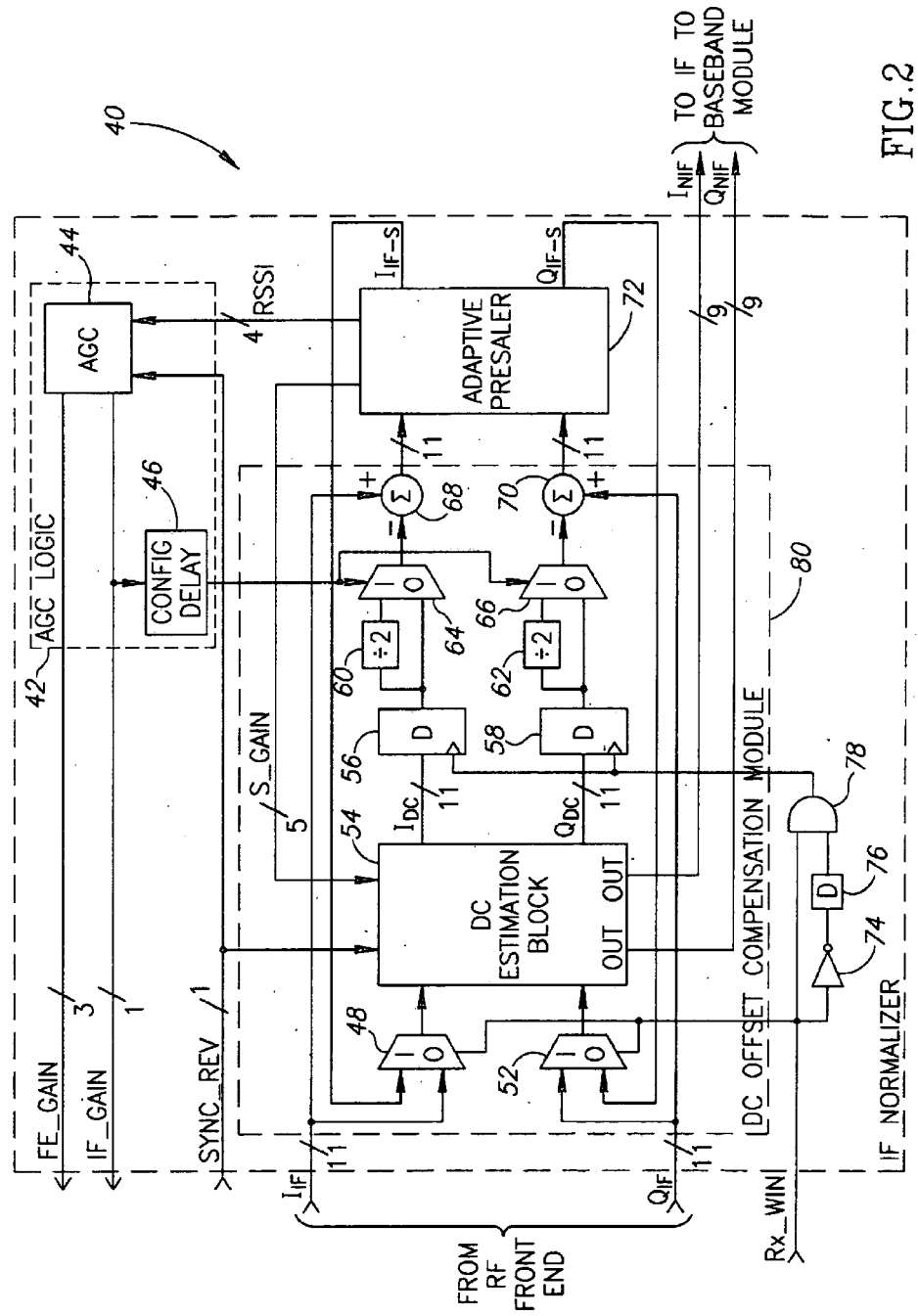
FIG. 2 is a block diagram illustrating the amplitude adjustment and DC offset compensation mechanism of the present invention applied to an example GFSK detector.

A block diagram illustrating the IF normalizer portion of the GFSK detector incorporating the amplitude adjustment and DC offset compensation mechanism of the present invention is shown in FIG. 2. The IF normalizer, generally referenced 40, comprises AGC logic module 42, DC offset compensation (DCOC) module 80, Adaptive Prescaler (APS) 72, inverter 74, D flip flop 76 and AND gate 78. The DCOC module is responsible for performing independent DC offset compensation of the I and Q signals. It comprises multiplexers 48, 52, DC estimation block 54, registers 56, 58, multiplexers 64, 70, divide by two 60, 62 and summers 68, 70.

The adaptive prescaler is responsible for the common scaling of the IF signals to the desired level. The operation of the adaptive prescaler is described in more detail hereinbelow. The AGC logic module functions to dynamically select the amplifier gain for the front end and IF portions of the receiver. It comprises a configurable delay 46 and AGC circuit 44.

The normalization of the IF signals is performed in multiple stages. In the example embodiment presented herein, three stages are used. The stage from the start of DCOC until an RX_start signal is received is termed stage 1 (i.e. portion of the packet before data is received). The stage from RX_start until Sync is received is termed stage 2 (i.e. the portion of the packet before sync is declared). The stage from the point when Sync is received until RX_stop is termed stage 3 (i.e. after Sync through the end of the packet).

During stage 1, a rough estimate of the DC offset is determined. This stage is before the RX_start when peak detection can be achieved relatively fast and is applied to signals whose amplitude corresponds to 2 to 11 bits. The DC offset estimate is then frozen and used to compensate the input signal. The compensated input signal is then input to the prescaler. A fine estimate of the DC offset is then determined using the output of the prescaler as input. The multiplexers 48, 52 are configured to pass the IF input signals during stage 1. The rough DC offset estimates for I and Q are stored in the registers 56, 58. Summers 68, 70 compensate the I and Q input signals by subtracting the DC estimate therefrom. The compensated signals are then passed through the prescaler for stage 2 which is after RX_start but before Sync detection when the input signals typically occupy 9-bits. Note that the target level is an integer in the range of 64–128 for the scaled signal amplitude.

The outputs of the prescaler are fed back to the DC estimation block for stage 3 fine DC offset estimation. This stage immediately follows the sync when 'quiet' or 'steady-state' operation is required from the peak detectors in the DC estimation block. An important feature of the IF normalizer is the reuse of the DC estimation circuit for stage 1 and stage 3 DC offset estimations. Multiplexers are configured to input either the IF input signals or the scaled IF signals output of the prescaler. This feature substantially reduces the gate count required to implement the invention.

This mechanism enables the detector to handle any signal level and DC offset of that signal as long as it is within the range of the analog to digital converters. From the occurrence of RX_start, the input signals to the adaptive prescaler are far enough from saturation and are spanned enough to permit further accurate DC offset compensation to yield normalized I and Q IF signals as desired.

Figure 3:
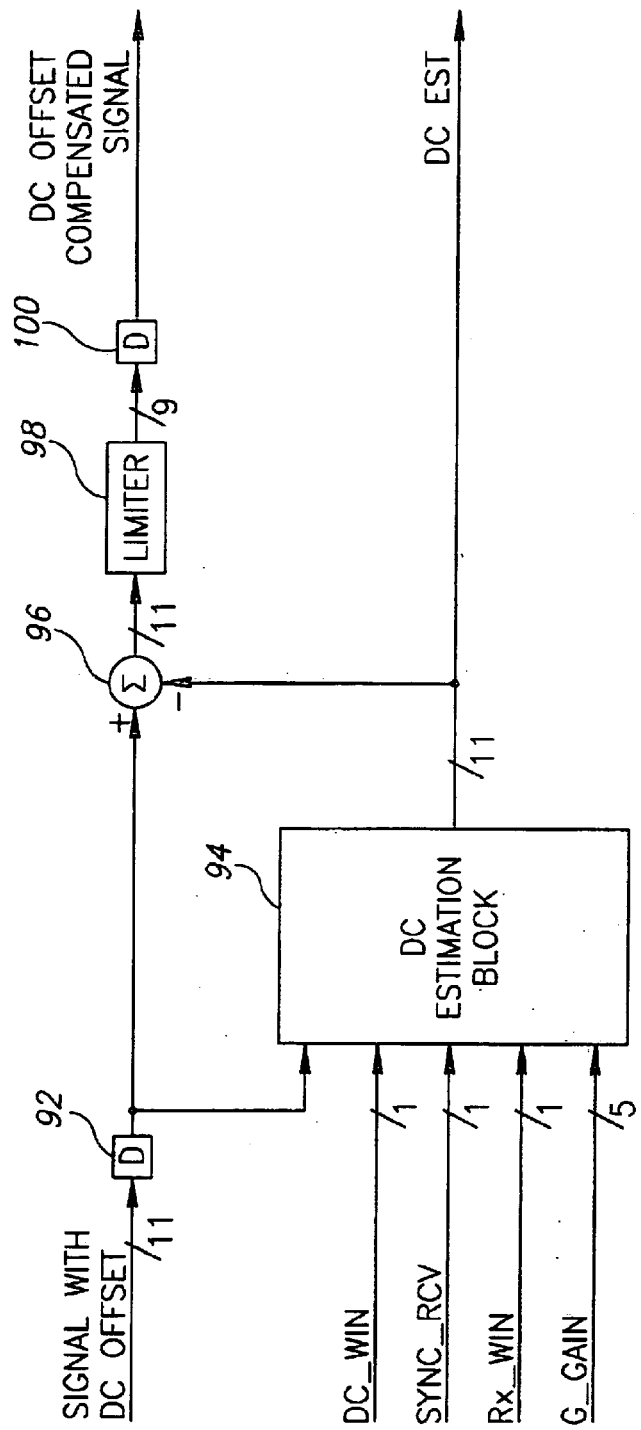
FIG. 3 is a diagram illustrating the main path of the I and Q signals in the DC offset compensation mechanism of the present invention.

The operation of the DC offset compensation module will now be described in more detail. A diagram illustrating the main path of the I and Q signals in the DC offset compensation mechanism of the present invention is shown in FIG. 3. The operation of the DCOC module is based on a peak detection mechanism. The module comprises separate peak detectors for $I_{IF}$ and $Q_{IF}$ but updates of the peak values triggered by gain changes are applied to both branches in common. The signal path for one of the branches ($I_{IF}$ or $Q_{IF}$), generally referenced 90, comprises a register 92, DC estimation block 94, summer 96, limiter 98 and register 100.

The IF signal first stored in a register 92 and input to the DC estimation block 94. The DC offset estimation is subtracted from the input signal and passed through a limiter 98 and stored in registers 100. The DC estimate may also be used for debugging or other purposes.

Figure 4:
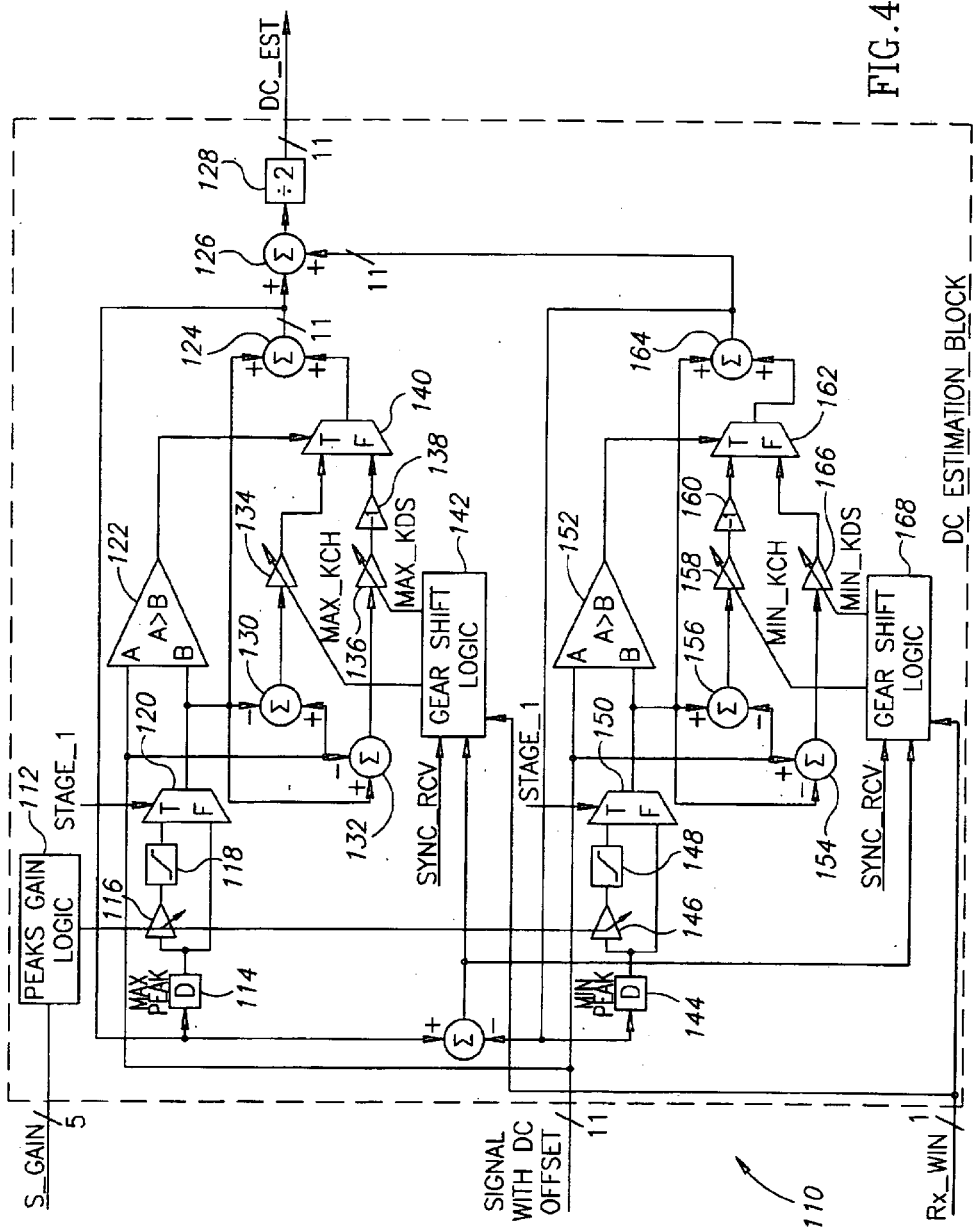
FIG. 4 is a block diagram illustrating the DC estimation block of the present invention in more detail.

A block diagram illustrating the DC estimation block of the present invention in more detail is shown in FIG. 4. The DC estimation block, generally referenced 110, functions to estimate the DC offset for one of the IF signals (I or Q). Two DC estimation blocks are required to compensate both I and Q signals. The DC estimation block is divided into two portions: a maximum determination portion and a minimum determination portion. The operation of both is similar. Register 114 stores the previous maximum peak value. The maximum peak value is compared via comparator 122 with the input signal (i.e. signal with DC offset). If the input signal is greater, the previous maximum peak value is subtracted from the input signal via summer 130 and multiplied by a maximum charge coefficient max_kch 134. The result is added via summer 124 to the previous maximum peak value to yield the current maximum peak value. The current maximum peak value replaces the previous maximum peak value at the next clock cycle.

If the input signal is not greater than the previous maximum peak value, the input signal is subtracted from the previous maximum peak value via summer 132, the difference multiplied by maximum discharge coefficient max_kds 136 and subtracted (multiply by minus one 138) from the previous maximum peak value via summer 124. Multilpexer 140 selects to either charge or discharge the maximum peak value in accordance with the result of the comparator 122. Gear shift logic 142 provides the charge and discharge coefficients max_kch and max_kds.

In similar fashion, the minimum peak value is determined. Register 144 stores the previous minimum peak value. The minimum peak value is compared via comparator 152 with the input signal (i.e. signal with DC offset). If the input signal is greater, the input signal is subtracted from the previous minimum peak value via summer 156 and multiplied by a minimum charge coefficient min_kch 158. The result is subtracted (multiply by minus one 160) via summer 164 from the previous minimum peak value to yield the current minimum peak value. The current minimum peak value replaces the previous minimum peak value at the next clock cycle.

If the input signal is not greater than the previous minimum peak value, the previous minimum peak value is subtracted from the input signal via summer 154, the difference is multiplied by minimum discharge coefficient min_kds 166 and added to the previous minimum peak value via summer 164. Multilpexer 162 selects to either charge or discharge the minimum peak value in accordance with the result of the comparator 152. Gear shift logic 168 provides the charge and discharge coefficients min_kch and min_kds.

The average is then taken of the maximum and minimum peak values via summer 126 and divided by two 128. The result is the DC estimate of the input signal. Note that alternatively, changes in scaling can be compensated in order to assist the DC estimation block in quickly acquiring the peak values. For the maximum peak, the signal passes through amplifier 116 and limiter 118. Multilpexer 120 selects either the limited peak value or the actual peak value depending on the present stage. Similarly, for the minimum peak, the signal passes trough amplifier 146 and limiter 148. Multilpexer 150 selects either the limited peak value or the actual peak value depending on the present stage. Peak gain logic 112 provides the gain settings for the amplifiers in accordance with the s_gain signal.

Thus, the DC estimation circuit functions to track the maximum and minimum peaks of the input signal. The average of the maximum and minimum peak values is taken as the estimate of the DC offset. The charge and discharge coefficients determine how fast the circuit tracks changes in the peak values. Note that the differences between stages is mostly changes in the charging and discharging coefficients of the peaks detectors output by the gear shift logic circuits. The difference between stage 1 and the other stages, however, is more than just coefficient changes. In stages 2 and 3 the circuit applies additional mechanisms of limiting the distance between peaks and updating the peaks according to the adaptive prescaler gains applied. The move from stage 1 to the other stages is practically performed by selecting a different branch of the multiplexer (120 or 150) situated before the peak detector comparator (122 or 152). Note also that preferably all charge and discharge coefficients are powers of two in order to simplify the implementation of the circuit.

Figure 5:
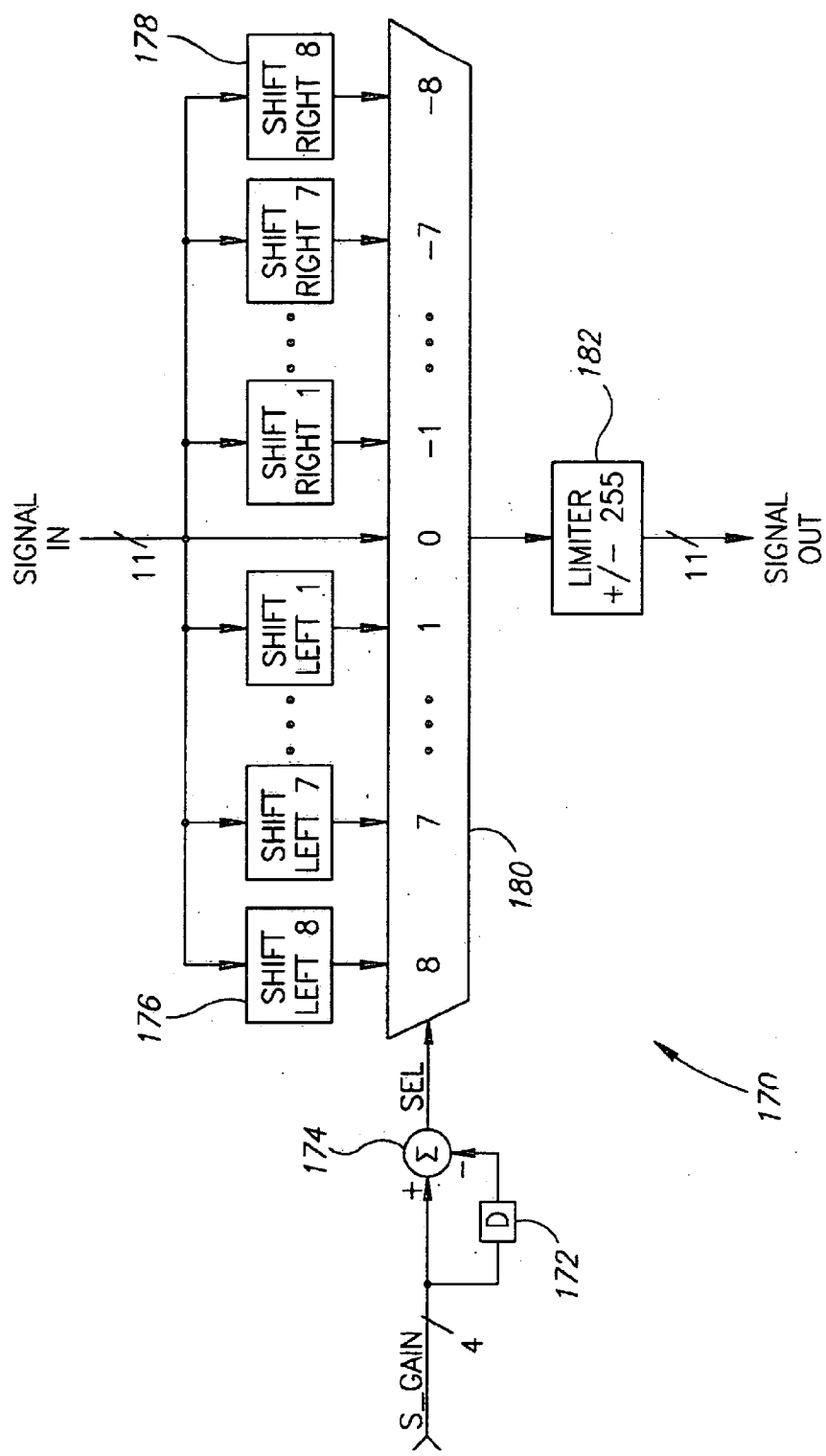
FIG. 5 is a block diagram illustrating the peak-detection gain selection logic portion of the DC estimation block in more detail.

A block diagram illustrating the peak-detection gain selection logic portion 112 (FIG. 4) of the DC estimation block in more detail is shown in FIG. 5. The S_gain value is determined by the prescaler and input to the DC estimation block. The difference in the current gain to the previous gain, stored in register 172, is generated via subtractor 175 and applied to the select control input of multiplexer 180. A plurality of shift left circuits 176 and shift right circuits 178 provide several shifts from a shift left of 8 through a shift right of 8. The magnitude and sign of the S_gain value determines the direction and magnitude of the shift of the input signal. The output of the multiplexer is input to a limiter 182 to yield the output signal.

A pseudo code listing illustrating the gear shift logic portion of the DC estimation block in more detail is shown in FIG. 6. Shown in Listing 1 is pseudo code of an example of the implementation of the gear shift logic. Charge and discharge coefficients for both the maximum and minimum peaks are provided. At stage 1 (i.e. before the RX_start event) the charge/discharge time coefficients of both the maximum peak detector (for the upper levels of the signal) and minimum peak detector (for the lower levels of the signal) are set to specific values and no limiting mechanism is active. Note that charge coefficients are set to quickly track the input signal. The discharge coefficients are set to be much smaller than the charge coefficients to provide slow discharge. Note that the fastest tracking is achieved by setting both maximum and minimum charging coefficients to one.

After the RX_start but before the Sync event (i.e. stage 2) the maximum and minimum charge/discharge coefficients are set to different values and the limiting mechanism is activated. After the Sync event (i.e. stage 3) both maximum and minimum charge/discharge coefficients are set to relatively small values in order to enable 'quiet' operation (i.e. steady state operation) of the peak detectors (i.e. slow tracking). Note that when the peaks are far from each other (e.g., value of 1024), then discharging should be fast. Conversely, when the peaks are close to each other (e.g., value of 100), then charging should be fast.

Figure 7:
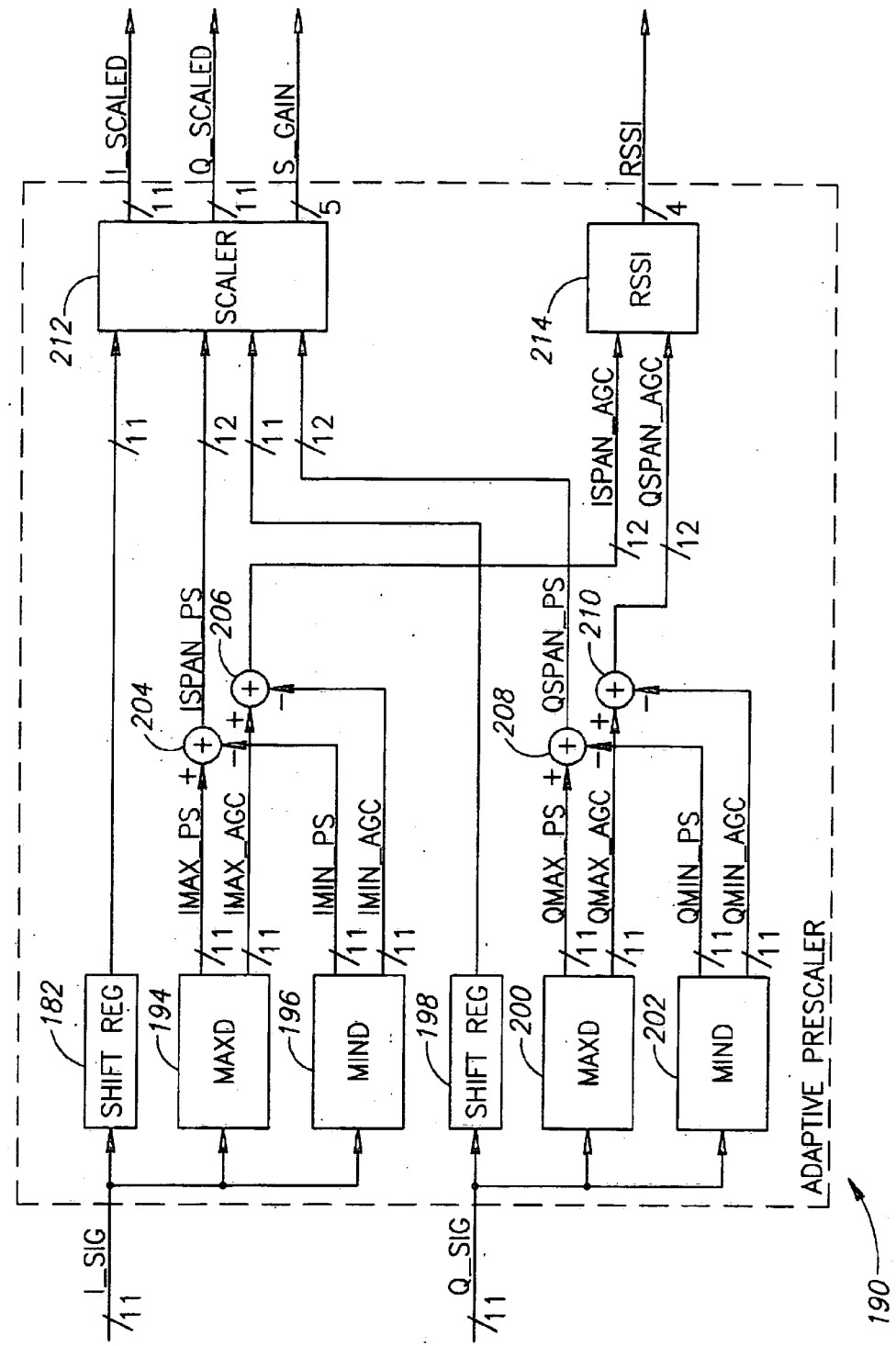
FIG. 7 is a block diagram illustrating the adaptive prescaler portion of the IF normalizer in more detail.

The adaptive prescaler will now be described in more detail. A block diagram illustrating the adaptive prescaler portion of the IF normalizer in more detail is shown in FIG. 7. The adaptive prescaler, generally referenced 190, comprises a scaler unit 212 that scales the input signals in steps of powers of 2, a Receive Signal Strength Indicator (RSSI) 214, maximum and minimum detectors (MAXD/MIND) 194, 196 for the I signal path and maximum and minimum detectors (MAXD/MIND) 200, 202 for the Q signal path, summers 204, 206, 208, 210 and shift registers 192, 198.

The RSSI unit 214 provides the current gain required to the AGC logic circuit 44 (FIG. 2) as an index number wherein the AGC logic circuit determines the actual gain from the index number. The MAXD/MIND detectors function as the basic blocks for determining the range of the signals and thus the gain for both the AGC logic circuit and the scaler. The shift registers 192 for the I signal path and shift register 198 for the Q signal path are used because the scaling is performed on the input data without any delay.

Figure 8:
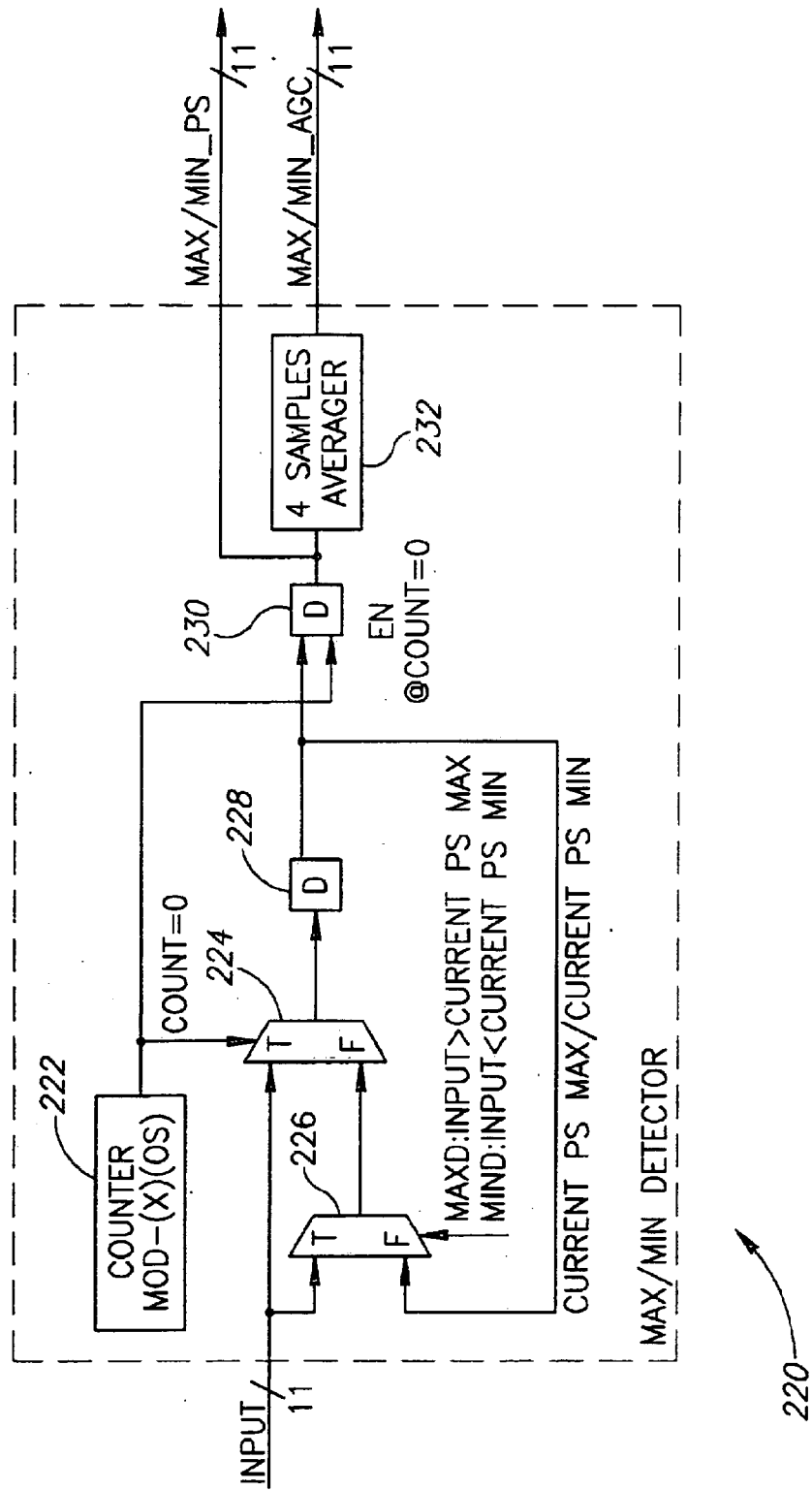
FIG. 8 is a block diagram illustrating the maximum/minimum detector portion of the adaptive prescaler in more detail.

A block diagram illustrating the maximum/minimum detector portion of the adaptive prescaler in more detail is shown in FIG. 8. The block diagram shown illustrates the operation of both the MIN and MAX detector with the differences being the multiplexer selection logic. For the MAXD, the criterion is whether the input is greater than the current Prescaler (PS) maximum. For the MIND, the criterion is whether the input is less than the current PS minimum. The circuit shown is also used for the I and Q signal paths in parallel as illustrated in FIG. 7. The MAXD/MIND, generally referenced 220, comprises a counter 222, multiplexers 224, 226, registers 228, 230 and four sample averager 232.

The goal of the detection circuit is to find the maximum and minimum in a window of length 2*OverSamplingRatio for the scaler 212 and to average every four such peaks for use by the AGC logic circuit. The detection mechanism operates serially and when the mechanism begins to operate on a new window, new data samples enter the shift register 192 or 198 (FIG. 7) and old samples exiting the shift register are scaled according to the previously determined gain value. The signal span (i.e. range) over a specific window (peak to peak amplitude) is determined by subtracting the MIN value from the MAX values for the prescaler (PS) and AGC logic circuit via summers 204, 206, 208, 210 and will thus always be positive (or zero). Note that the MAX/MIN_AGC signal should be updated once every four samples of the MAX/MIN_PS. Both outputs should be initialized to zero.

Figure 9:
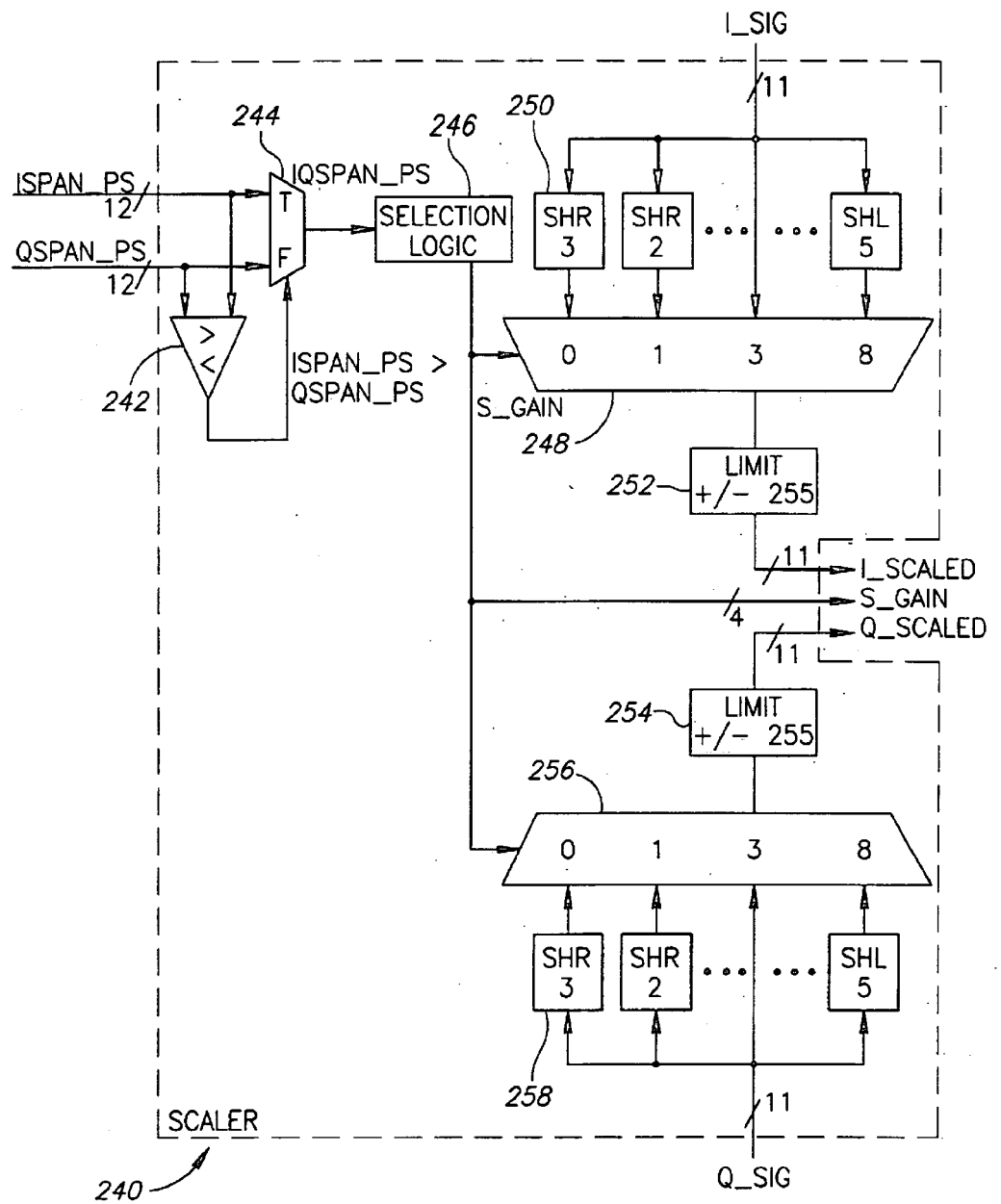
FIG. 9 is a block diagram illustrating the scaler portion of the adaptive prescaler in more detail.

A block diagram illustrating the scaler portion of the adaptive prescaler in more detail is shown in FIG. 9. The scaler, generally referenced 240, comprises a comparator 242, multiplexers 244, 248, 256, selection logic 246, shifters 250, 258 and limiters 252, 254. The scaler operates on both I and Q signals with the same scaling coefficients in order to prevent I/Q gain mismatches. Note that since scaling is performed in powers of two, independent scaling of I and Q signals could cause severe mismatch.

As in the peak-detection gain selection logic portion of the DC estimation block illustrated in FIG. 5, the scaler utilizes a plurality of fixed shifts of the I and Q signals and selects one of the possible shifts as the output in accordance with the S_gain signal produced by the selection logic 246. First, the I and Q signals are compared to each other. Whichever signal is greater is passed to the selection logic. The S_gain signal selects one of nine possible shifts, from a shift right of 3 to a shift left of 5. The output of the multiplexers for both I and Q paths are input to limiters. The output of the limiters yields the scaled I and Q signals values. A pseudo code listing illustrating the operation of the selection logic 246 of the scaler portion of the adaptive prescaler is shown in FIG. 10. As shown in Listing 2, lower gain settings are applied for higher peak to peak values. Conversely, higher gain settings are applied for lower peak to peak values.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of DC offset estimation, said method comprising the steps of:

at a DC estimation circuit:

determining a current maximum peak value of an input signal;

determining a current minimum peak value of said input signal; and calculating an average of said current maximum peak value and said current minimum peak value to yield a DC offset estimate;

storing the DC offset estimate provided by the DC estimation circuit;

compensating the input signal using the DC offset estimate;

scaling the compensated input signal;

providing the scaled compensated input signal back to the DC estimation block in order to perform a fine DC offset estimation on the scaled compensated input signal.

2. A method of DC offset estimation, said method comprising the steps of:

determining a current maximum peak value of an input signal;

determining a current minimum peak value of said input signal;

calculating an average of said current maximum peak value and said current minimum peak value to yield a DC offset estimate; and wherein said stop of determining said current maximum peak value comprises the steps of:

comparing said input signal with a previous maximum peak value;

if said input signal is greater than said previous maximum peak value, adding said current maximum peak value to a first difference between said input signal and said previous maximum peak value, said first difference multiplied by a maximum charge coefficient to yield said current maximum peak value; and if said input signal is not greater than said previous maximum peak value, subtracting a second difference between said current maximum peak value and said input signal multiplied by a maximum discharge coefficient from said previous maximum peak value to yield said current maximum peak value.

3. The method according to claim 2, further comprising the step of applying a limiting function to said previous maximum peak value.

4. The method according to claim 2, further comprising the step of scaling said previous maximum peak value before comparison with said input signal.

5. The method according to claim 2, further comprising the step of generating said maximum charge coefficient and said maximum discharge coefficient in accordance with the occurrence of a specific event.

6. The method according to claim 5, further comprising the step of applying a limiting function to said previous maximum peak value.

7. The method according to claim 5, further comprising the step of scaling said previous maximum peak value before comparison with said input signal.

8. The method according to claim 5, further comprising the step of generating said minimum charge coefficient and said minimum discharge coefficient in accordance with the occurrence of a specific event.

9. The method according to claim 2, further comprising the step of subtracting said DC offset estimate from said input signal to yield a DC offset compensated output signal.

10. A method of DC offset estimation, said method comprising the steps of:
determining a current maximum peak value of an input signal;
determining a current minimum peak value of said input signal;
calculating an average of said current maximum peak value and said current minimum peak value to yield a DC offset estimate; and
wherein said step of determining said current minimum peak value comprises the steps of:
comparing said input signal with a previous minimum peak value;
if said input signal is not greater than said previous maximum peak value, subtracting a first difference between said current minimum peak value and said input signal, said first difference multiplied by a minimum discharge coefficient and subtracted from said previous minimum peak value to yield said current minimum peak value; and
if said input signal is greater than said previous minimum peak value, adding said current minimum peak value to a second difference between said input signal and said previous minimum peak value, said second difference multiplied by a minimum charge coefficient to yield said current minimum peak value.

11. An apparatus for DC offset estimation, comprising:
a DC estimation block for providing a DC offset estimate of an input signal;
adaptive prescaler for scaling the compensated signal in order to provide a scaled signal; and
a selector circuit for receiving the input signal and scaled signal and providing the scaled signal to the DC estimation block in order for the DC estimation block to perform a fine DC offset estimation of the scaled signal.

12. An apparatus for DC offset estimation, comprising:
first means for determining a current maximum peak value of an input signal;
second means for determining a current minimum peak value of said input signal;
third means for calculating an average of said current maximum value and said current minimum peak value to yield a DC offset estimate; and
wherein said first means for determining said current maximum peak value comprises:
means for comparing said input signal with a previous maximum peak value;
means for adding said current maximum peak value to a first difference between said input signal and said previous maximum peak value, said first difference multiplied by a maximum charge coefficient to yield said current maximum peak value if said input signal is greater than said previous maximum peak value; and
means for subtracting a second difference between said current maximum peak value and said input signal multiplied by a maximum discharge coefficient from said previous maximum peak value to yield said current maximum peak value if said input signal is not greater than said previous maximum peak value.

13. The apparatus according to claim 12, further comprising means for applying a limiting function to said previous maximum peak value.

14. The apparatus according to claim 12, farther comprising means for scaling said previous maximum peak value before comparison with said input signal.

15. The apparatus according to claim 12, further comprising means for generating said maximum charge coefficient and said maximum discharge coefficient in accordance with the occurrence of a specific event.

16. An apparatus for DC offset estimation comprising:
first means for determining a current maximum peak value of an input signal;
second means for determining a current minimum peak value of said input signal;
third means for calculating an average of said current maximum peak value and said current minimum peak value to yield a DC offset estimate; and
wherein said second means for determining said current minimum peak value comprises:
means for comparing said input signal with a previous minimum peak value;
means for subtracting a first difference between said current minimum peak value and said input signal, said first difference multiplied by a minimum discharge coefficient and subtracted from said previous minimum peak value to yield said current minimum peak value if said input signal is greater than said previous maximum peak value; and
means for adding said current minimum peak value to a second difference between said input signal and said previous minimum peak value, said second difference multiplied by a minimum charge coefficient to yield said current minimum peak value if said input signal is not greater than said previous minimum peak value.

17. The apparatus according to claim 16, further comprising means for applying a limiting function to said previous maximum peak value.

18. The apparatus according to claim 16, further comprising means for scaling said previous maximum peak value before comparison with said input signal.

19. The apparatus according to claim 16, further comprising means for generating said minimum charge coefficient and said minimum discharge coefficient in accordance with the occurrence of a specific event.

20. An apparatus for DC offset compensation comprising:
   first means for determining a current maximum peak value of an input signal comprising;
      means for comparing said input signal with a previous maximum peak value;
      means for adding said current maximum peak value to a first difference between said input signal and said previous maximum peak value, said first difference multiplied by a maximum charge coefficient to yield said current maximum peak value if said input signal is greater than said previous maximum peak value;
      means for subtracting a second difference between said current maximum peak value and said input signal multiplied by a maximum discharge coefficient from said previous maximum peak value to yield said current maximum peak value if said input signal is not greater than said previous maximum peak value;
   second means for determining a current minimum peak value of said input signal comprising;
      means for comparing said input signal with a previous minimum peak value;
      means for subtracting a first difference between said current minimum peak value and said input signal, said first difference multiplied by a minimum discharge coefficient and subtracted from said previous minimum peak value to yield said current minimum peak value if said input signal is greater than said previous maximum peak value;
      means for adding said current minimum peak value to a second difference between said input signal and said previous minimum peak value, said second difference multiplied by a minimum charge coefficient to yield said current minimum peak value if said input signal is not greater than said previous minimum peak value;
   third means for calculating an average of said current maximum peak value and said current minimum peak value to yield a DC offset estimate; and
   fourth means for subtracting said DC offset estimate firm said input signal to yield a DC offset compensated output signal.

21. A method of amplitude adjustment and DC offset compensation, said method comprising the steps of:
   first performing coarse DC offset compensation comprising the steps of:
      determining a first current maximum peak value of an input signal;
      determining a first current minimum peak value of said input signal;
      calculating an average of said first current maximum peak value and said first current minimum peak value to yield a first DC offset estimate;
      subtracting said first DC offset estimate from said input signal to yield a first DC offset compensated signal;
   scaling said first DC offset compensated signal to within a predefined range of amplitudes to yield a scaled signal;
   second performing fine DC offset compensation comprising the steps of:
      determining a second current maximum peak value of said scaled signal;
      determining a second current minimum peak value of said scaled signal;
      calculating an average of said second current maximum peak value and said second current minimum peak value to yield a second DC offset estimate; and
      subtracting said second DC offset estimate from said scaled signal to yield an output DC offset compensated signal.

* * * * *